Patented June 6, 1944

2,350,526

UNITED STATES PATENT OFFICE 2,350,526

WATER-INSOLUBLE SOAP OF SOAP-FORMING ACIDS IN POWDERED, FREE-FLOWING FORM

Grady M. O'Neal, Chicago, Ill., assignor to The Sherwin-Williams Company, Cleveland, Ohio, a corporation of Ohio No Drawing. Application March 17, 1943, Serial No. 479,499

18 Claims. (Cl. 106—243)

This invention relates generally to soaps, and in particular to special water-insoluble metallic soaps of organic acids which are condensation products of rosin or abietic acid with unsaturated aliphatic acids having up to, but not more than, two carboxyl groups, and related compounds.

The principal object of the invention is to prepare water-insoluble metallic soaps especially adapted for association with azo pigment dyestuffs and coating compositions made therefrom, in the course of their manufacture, to give new and improved properties and also processing advantages.

A more specific object of the invention is to prepare new water-insoluble, rosinic-fatty type acid metallic soaps having outstanding utility in combination with azo pigment dyestuffs.

Another object of the invention is to obtain these new, rosinic-fatty type acid metallic soaps in the form of free-flowing powders.

Still another object of the invention is to prepare these new, rosinic-fatty type acid metallic soaps by a procedure enabling salt electrolyte to be readily incorporated in and retained with the dry soap powders.

Water-insoluble metallic soaps have hitherto been prepared from organic acids, such as naphthenic and various types of resinic or fatty acids. In some instances the physical nature of a water-insoluble metallic soap is unimportant to the use to which it is to be put; in others, its successful use depends upon its physical form.

The constitution of an organic acid governs to a great degree the physical properties of a water-insoluble metallic soap made therefrom. In general it may be stated that resinic acid tends to give a free-flowing type of soap when produced as a dry powder; and fatty type acid, a grease-like soap, which is difficult, if not impossible, to convert into a free-flowing powder.

Rosin, also called colophony, is the resin remaining after distilling turpentine from the exudation of various species of pine, e. g., "*Pinus palustris.*" Due to the fact that the constituents of rosin seem to vary, according to its geographical source of origin, its composition is not always constant. According to E. Stock, "Farben-Zeitung" vol. 27, pages 156–7, 221–2, 287–8, 353–4, 416–7 (1921), a typical American rosin or colophony possessed this composition: 31% α-abietic acid, 31% β-abietic acid, 19% γ-abietic acid, 10% resene, 0.5% ethereal oils, 0.5% impurities, and some water. Most investigators seem to agree that rosin contains a high percentage of abietic acid, although not all of them report the isomeric forms of Stock. In general, the abietic acid content of rosin seems to lie in the range of 80–90%, along with a variation in the other constituents.

The term "salt electrolyte," as used in this invention, comprehends generally those salts which are water-soluble and substantially neutral when ionized in aqueous solution, in particular, the water-soluble salts of the alkali and alkali-earth metals. While salts of the strong mineral acids, such as hydrochloric or nitric, are most usually illustrated in the examples given herein, others have been employed, such as salts of sulfuric acid, or salts of weak organic acids (formic, acetic, citric, oxalic, and others). Also cations other than the alkali and alkali-earth metals have been employed as salts of a variety of acids, such cations being iron, lead, zinc, manganese, copper, and others. In general, the choice of the best particular salt electrolyte for use in the complex rosinic-fatty type acid soap depends upon the nature of the complex soap, as well as upon the use to which the soap is to be put, and is best determined experimentally for any particular application.

In my cofiled applications, Serial Nos. 479,493, 479,495, 479,496, and 479,498, which applications relate to azo pigment dyestuffs, coating compositions made therefrom, and methods of manufacturing the same, the improvements resulting from the use of water-insoluble metallic soaps of fatty type acid and of rosinic acid, either in physical or chemical combination, are disclosed.

In my cofiled application, Serial No. 479,493, I have disclosed and claimed a generic invention based upon the discovery that water-insoluble, metallic, rosinic-fatty type acid soaps possess new and valuable properties useful in the manufacture and use of azo pigment dyestuffs. In my cofiled applications, Serial Nos. 479,495 and 479,496, referred to above, I have disclosed and claimed two wet processes by means of which the said generic invention can be advantageously employed to produce azo pigment dyestuffs of the non-lake type and of the lake-type. While the two wet processes of the last mentioned applications are of great value and demonstrate outstanding advantages in certain pigment manufacturing operations, they possess a number of characteristics which tend to limit their fields of usefulness. Neither of these procedures is readily applicable to treating the alkali-metal salt forms of azo pigment dyestuffs. Also, the processing operations involved in these procedures include additional steps over those required in normal prior art pigment manufacturing operations and involve steps which, in certain applications, are undesirably complex.

In my cofiled application, Serial No. 479,498, I have disclosed and claimed a dry process for treating azo pigment dyestuffs with water-insoluble, rosinic-fatty type acid metallic soaps which is supplemental to the two wet processes for certain objectives, and by which the utility of the generic invention of my application, Serial No. 479,493, may be extended to the treatment of alkali-metal salt forms of azo pigment dyestuffs, in addition to the non-salt and other salt-forms.

In my cofiled application, Serial No. 479,494, I have disclosed and claimed, as new compositions of matter, a class of physically and/or chemically combined rosinic and fatty type acid soaps in dry powdered form, as well as a process for making such soaps. The rosinic-fatty type acid soaps of that application, because of the nature of their composition, do not possess the grease-like characteristics of fatty type acid soaps alone. Those rosinic-fatty type acid soaps are particularly well adapted for use in the process which is the subject matter of my application, Serial No. 479,498, referred to above.

The present application is directed to a class of rosinic-fatty type acid soaps which is closely related in its utility and its constituent compounds to the class of soaps disclosed and claimed in my application, Serial No. 479,494.

The above mentioned objectives of the present invention, and others which will become apparent to those skilled in the art, result from employing an organic acid derived from the condensation of an unsaturated aliphatic acid containing up to, but not more than, two carboxyl groups, with rosin or abietic acid, and forming the water-insoluble metallic soaps by any suitable method. The methods of condensation of the fatty type acid with the rosin or abietic acid may vary and are generally performed by either a diene addition or a polymerization-condensation type of synthesis.

The diene synthesis (Diels-Alder reaction), as is well known, takes place between compounds containing a conjugated double linkage and certain ethylene or acetylene derivatives, provided that the unsaturated linkages in the latter have been "activated" by the presence, adjacent, to either carbon atom of the α,β-positions, of such groups as —CO, —CN, and —C=C—, and sometimes —NO₂. In this instance, rosin or abietic acid is the compound containing the conjugated double linkages. A few of the typical ethylene or acetylene derivatives capable of being used in a diene addition with rosin or abietic acid are the following α,β-unsaturated aliphatic acids:

HC—COOH
‖
CH₃—CH

Crotonic acid

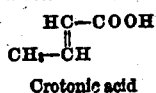

Pyrocinchonic anhydride

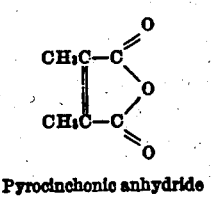

Maleic anhydride

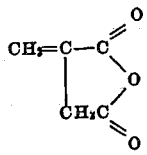

Itaconic anhydride

C—COOH
‖‖‖
C—COOH

Acetylene dicarboxylic acid

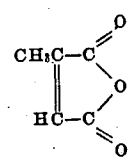

Citraconic anhydride

For the purposes of describing this invention, such acids and anhydrides are occasionally referred to as "fatty type acids." As this term is used herein, and in my related applications referred to above, it includes also those acids traditionally known and commonly referred to as "fatty acids." When referring specifically to members of the latter group of long chain acids, this specification employs the common term "fatty acids." For a clear understanding of the specification, therefore, this distinction in terms should be noted. A detailed definition of the class of "fatty type acids" appears in my related applications, referred to above.

A product utilizing this synthesis may be readily prepared by condensing maleic anhydride and rosin. The resulting adduct, if the rosin is considered as abietic acid, is given by Ruzicka, "Helv. Chim. Acta," 15, 1289-94 (1932), as:

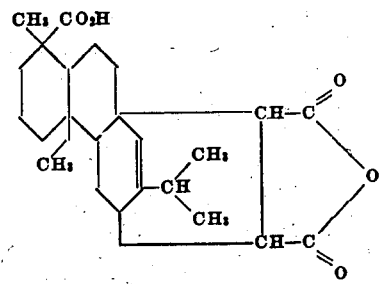

This invention, employing the diene synthesis for the preparation of the adduct, may best be understood by reference to the following illustrative example:

*Example 1*

The exact procedure for effecting a diene addition, as is well known, is capable of considerable variation. In effecting the condensation of rosin with maleic anhydride, for the example in question, I prefer to operate with an excess of rosin. In this instance, 1 part of maleic anhydride is heated with 6.8 parts of E wood rosin at 150° C. until the reaction is substantially complete. A dark reddish resin product is obtained, which saponifies readily with sodium hydroxide to give a soluble sodium salt in water.

To an agitated solution at 90° C. produced from 450 parts of water; and 18.0 parts of the sodium salt of the product resulting from the above maleic acid-rosin condensation, as a 10% solution in water, add 10.5 parts of barium chloride (BaCl₂.2H₂O) dissolved in 200 parts of water. After 15 minutes of agitation, while maintaining the temperature at 90° C., filter off the resulting water-insoluble metallic soap. Wash thoroughly, dry, and grind to a powder.

This metallic soap, either in a pure form or with unreacted rosin, because of its insoluble, free-flowing, granular, powdered form, and also because of its chemical constitution, is of particular value for treating azo pigment dyestuffs. When employed in the manner disclosed in my cofiled application, Serial No. 479,498, discussed above, it produces pigments that are capable of being ground into a vehicle in much less time than pigments not so treated. These new pigment compositions including such soap, in turn, produce coating compositions having bettered flow, improved film gloss, and decreased set-up.

An alternative step in the soap preparation is to proceed as above through the filtration step and then, without washing, dry to retain salt electrolyte from the filtrate with the soap. The advantages of salt electrolyte in a water-insoluble metallic soap for use in associating with azo pigment dyestuffs are that the resulting pigment products have increased utility in the manufacture of various coating compositions, resulting from improved wetting and bettered dispersion of the pigment into the vehicle. Also, in certain ink uses, greater emulsion inhibition is secured.

It is possible to retain salt electrolyte with the soap in the manner indicated even where stoichiometrically equivalent amounts of salt precipitant have been employed to precipitate the desired metallic soap, the cation of the soluble soap and the anion of the salt precipitant combining to form the salt electrolyte. It has been found, however, that where the presence of adhering or occluded salt electrolyte is advantageous, generally the same cation salt that serves as the precipitant is better employed in excess as a supplier of additional salt electrolyte.

It is, of course, to be understood that other metallic salts than barium chloride may be used to convert the soluble soaps to an insoluble metallic form. A variety of water-insoluble metallic soaps possessing varying properties have been prepared. In general, it is preferred to use as precipitants, salts of the group II metals: magnesium, calcium, strontium, and barium. It is possible, however, to use other cation salts, but, in some instances, where the soap is to be used in treating a pigment for use in a vehicle that dries by an oxidation process, soaps of certain metals have been found to act as driers. Soaps that have been found to have the catalytic property of accelerating such drying are those of iron, manganese, and lead. Other metals, such as the alkali-earth metals, lack this property and may be used for soaps of the present invention in drying vehicles without danger of functioning as driers.

Referring now to the polymerization-condensation type of synthesis mentioned above, it is well known to those versed in the art of polymerization and condensation, that long chain aliphatic acids possessing more than one unsaturated bond may be made to polymerize and condense to form complex products. The nature of these polymerization and condensation reactions is dependent upon numerous factors, among which may be mentioned temperature, catalysts, pH, concentration, reactant proportions, and time of heating. In other words, the manner in which the reaction is caused to take place will have a great bearing upon the nature of the product. The said complex products so obtained are postulated to be the result of two types of reactions:

1. Polymerization reactions leading to a decrease in the number of ethylenic linkages, with little or no corresponding change in molecular weight, and
2. Condensation reactions involving the elimination of water and other products with certainty of change in molecular weight.

I have found that an incompletely polymerized oil, preferably an oil of the drying oil type, which has been condensed with rosin to form a resulting glyceride ester condensation-polymer may be treated with an alkali to saponify the ester, whereby the free acid becomes available. The alkali salt of such free acid is first obtained, and from this, or from the free acid thereof, other soaps may be prepared.

The heat-bodying of linseed oil and other drying oils is a polymerization-condensation reaction well known and long practiced. The heating of drying oils with such materials as rosin and other resins to produce varnishes is also old and well known and has been carried out under a variety of conditions, for example, in the presence of either an organic neutralizing agent, such as glycerin, or an inorganic material, such as lime. These materials, when suitably processed, result in numerous varnishes possessing a variety of properties, these properties being dependent upon the exact manner in which the particular polymerization-condensation reaction is carried out. If, however, the reaction is continued past the usual varnish stage, a point can be eventually reached wherein a resin product may be obtained as a result of the reaction between the rosin-substance and oil. All of this is well known in the art and can be found described in numerous publications. For example, a discussion of the use of rosin and a drying oil in the polymerization-condensation reaction just referred to is given in some detail in Ellis: "Synthetic Resins and Their Plastics" (1923 ed.), chap. 16; and Ellis: "The Chemistry of Synthetic Resins," vols. I–II (1935 ed.), chaps. 37 and 38. Likewise, it may be mentioned that as such a polymerization-condensation reaction, in which a drying oil and rosin are utilized, progresses, there is an increasing tendency for the resulting product to darken, due largely to oxidation.

The use of the various products from a polymerization-condensation reaction (in which rosin or abietic acid and a drying oil are involved) as a means for obtaining a chemical raw material from which to derive a soap-forming acid, or soap thereof, has never been employed heretofore, in so far as I am aware. Example 2, which follows, illustrates one manner in which such a product may be obtained.

*Example 2*

Into a suitable reaction vessel place the following: 120.0 parts of raw linseed oil and 80.0 parts of E wood rosin. Heat the agitated reaction mass to 150° C. When complete solution of the rosin results, add 25.0 parts of ethylene glycol. Now, with a passage of air through the mass slowly raise the reaction temperature to 275°–290° C. The air passage and agitation are continued at this temperature until no longer feasible. Then the reaction mass is maintained at 290° C., until the mass is quite viscous. When cooled to room temperature, a rubbery, semi-solid, black, addition product having a high molecular weight is obtained. Its exact chemical constitution is variable, complex, and unknown. In more common terms, it could be referred to as an overheated ester-gum varnish.

This black, semi-solid mass obtained from the above reaction is known not to be an acid because of its chemical behavior. Likewise, because treatment with sodium hydroxide saponifies it and produces a sodium salt, it is most certain to be an ester. I have discovered that this sodium salt is a water-soluble soap capable of being converted into a water-insoluble metallic soap. The water-soluble and the water-insoluble soaps have the characteristic behaviors of both rosin soaps and of fatty acid soaps, but in addition they have the behavior of a mixture of rosinic acid soap and a fatty acid soap, as evidenced when used in combination with an azo pigment dyestuff as herein described.

The above mentioned black ester-compound may be saponified and converted to insoluble metallic soap, as follows:

Into a 200 cc. volume steel bomb, place 170 cc. of a 3% by weight sodium hydroxide solution and 10 gm. of the above resinic-fatty acid condensation-polymer, in the form of small particles up to about a ¼ inch diameter. With constant agitation through the heating and cooling period, heat to 170° C. in one hour, and then hold at 168° to 170° C. for 5 hours. Then cool, and remove from the bomb. A dark, black liquid results. Filter to remove the small amount of carbonaceous and unsaponifiable material. Acidify the filtrate liquor with dilute acetic acid, while agitating, until phenolphthalein gives only a faint pink test for alkali. Heat to 50° C., and then add a salt solution consisting of 7.0 gm. of barium chloride ($BaCl_2.2H_2O$) in 50 cc. of water. Upon completion of the salt addition, continue the heat at 50° C. for five minutes. Filter, wash thoroughly, and dry. When ground, the resulting, water-insoluble, rosinic-fatty acid metallic soap is light brown in color, and is a non-greasy free-flowing powder.

The soap produced by following Example 2 possesses the same utility and advantages as the soap of Example 1 when incorporated with azo pigment dyestuffs. Likewise, as in the case of the soap preparation of Example 1, the procedure of Example 2 may be followed through the filtration step and the soap dried without washing in order to retain salt electrolyte therewith. Beneficial results, as explained in connection with Example 1, are obtained thereby.

Linseed oil is known as a drying oil and is mainly a mixture of unsaturated fatty acids in the form of the glyceride esters. When linseed oil is analyzed for its fatty acid content, results, as customarily reported, for a typical oil are as follows:

| Nature of acid: | Percent present |
|---|---|
| Palmitic | 2.7– 3.8 |
| Stearic | 5.4– 7.7 |
| Oleic | 6 –12 |
| Linolic | 35 –47 |
| Linolenic | 37 –42 |

Linolic acid is 9:12-octadecadienoic acid, or

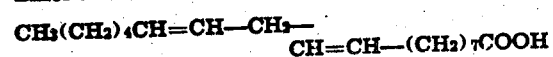

linolenic, 9:12:15-octadecatrienoic acid, or

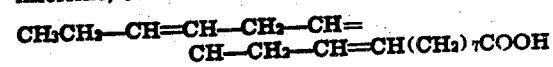

It is seen, therefore, that two unsaturated monocarboxylic acids of the general type

and $C_nH_{2n-5}COOH$ are the main constituents of linseed oil.

In a similar manner, other unsaturated monocarboxylic acids may be combined with rosin or abietic acid by means of the condensation-polymerization method of Example 2. However, because of economic considerations, I prefer to use these acids in the form of the drying oils. A few drying oils which have been found to react in this desired manner are: hempseed oil, Perilla oil, molecularly-dehydrated castor oil, Chinawood oil, sunflower seed oil, and oiticica oil. These are commonly available natural or modified natural materials which are representative of unsaturated aliphatic acids having up to, but not more than, two carboxyl groups, which acids are capable of entering into chemical combination with rosin or abietic acid. A host of others are known as chemical entities, for example, the polyene monocarboxylic acids having from 6 carbon atoms, such as sorbic, to 18 carbon atoms, such as elaeostearic acid, found in tung oil; and the polyene dicarboxylic acids having from 6 carbon atoms, such as muconic acid, to 16 carbon atoms, such as tetradecaheptane-1,14-dicarboxylic acid. Few of the polyene dicarboxylic acids occur in natural materials, such as oils, fats, and the like.

Because of the different chemical nature of common drying oils, the prepared water-insoluble metallic soaps all have varying properties. Also, the various factors affecting polymerization reactions, as discussed earlier, govern the nature of the completed rosinic-fatty acid condensation product. Hence, it is seen that the composition and nature of the final rosinic-fatty acid metallic soap is capable of wide variation.

It is believed that the condensation of the unsaturated monocarboxylic acids as the glycerides, or as the polymerized forms illustrated by Example 2, consists of an addition, at one of the double bonds of the compound, to the conjugated double linkages in the abietic acid molecule.

It is pointed out that the actual procedural route for arriving at the desired complex acids of this invention is capable of wide variation. In Example 1, a typical ethylene dicarboxylic acid, in the form of its anhydride, is condensed with rosin to give a complex soap-forming acid directly. In Example 2, a typical mixture of unsaturated, long-chain, aliphatic, monocarboxylic acids, that are common in drying oils, is condensed (the glyceride esters of these unsaturated monocarboxylic acids being employed in this instance) with rosin to give a condensation-polymer glyceride ester, this ester being then saponified with alkali to give a complex soap-forming acid. It is to be understood that it is possible to use other ester forms of these unsaturated aliphatic acids in effecting their condensation with rosin or abietic, and it is not necessary that these esters be those of unsaturated, long chain, aliphatic, monocarboxylic acids; for example, it is possible to form the identical maleic acid-abietic acid condensation product obtained in Example 1, by condensing instead the dimethyl ester of maleic acid with abietic acid to give the ester adduct, and then subsequently saponifying the ester adduct with alkali. Likewise, it is possible to take the methyl ester of abietic acid and condense it with maleic anhydride and then subsequently saponify the resulting ester adduct to obtain a product identical in nature with that of Example 1. Also, these condensations may be effected in solvents, suitably boiling in a temperature range adapted for conduct of the condensation. All of this is well known.

The foregoing examples are merely illustrative of two specific procedures for chemically combining rosin or abietic acid with unsaturated aliphatic acids having up to, but not more than, two carboxyl groups, and of the use of the resulting complex acids to form the soaps of this invention. It will be apparent to those skilled in the art that it is possible to chemically combine the disclosed equivalents of these two acids in different proportions and to vary widely the actual condensation conditions, and, nevertheless, still obtain, to varying degrees, products having the characteristics obtained in these examples, without departing from the invention herein set forth. It will also be apparent that still other procedures may be adopted for chemically combining the two types of acids to produce organic compounds capable of forming complex soaps similar to those of the examples. I do not intend the specific examples given to be construed as limiting the scope of my invention, as to either the proportions, reaction conditions, or procedure employed in chemically combining the two types of acids to produce intermediates for the soap formation process. My invention embraces the discovery that the various possible chemically combined forms of a rosinic acid and a fatty type acid can be employed to give soap-forming acids, which are capable of forming dry, free-flowing, powdered soaps possessing special utility in the manufacture of improved azo pigment dyestuffs and coating compositions made therefrom.

It is noted that Example 1 produces the free acid, and that Example 2 produces an ester. Both the said free acid and the said ester are characterized by having a complex soap-forming acid radical which is more than monobasic, which radical also characterizes soaps made therefrom. The free acid of the condensation reaction, or free acid derived from the described soaps, or the radical thereof, may be readily converted into derivatives other than the soaps herein described, by reactions analogous to those employed with common soaps. For example, the sulfonates and other derivatives of the free acid may be made, employing the teaching hereof that there is a valuable complex acid available as a chemical raw material.

The present application is a continuation in part of my copending applications, Serial Nos. 348,687 to 348,690, inclusive, filed July 31, 1940; and Serial Nos. 427,919 and 427,920, both filed January 23, 1942.

What I claim as my invention and desire to secure by Letters Patent is:

1. A dry, free-flowing, powdered, water-insoluble, metallic soap having the complex soap-forming acid radicals of the substance which results from the condensation of resin substance selected from the group consisting of rosin and abietic acid, with material selected from the group consisting of unsaturated aliphatic acids having up to, but not more than, two carboxyl groups, their anhydrides, and their esters.

2. A soap composition in dry, free-flowing, powdered form comprising a small amount of salt electrolyte physically associated with a water-insoluble metallic soap having the complex soap-forming acid radicals of the substance which results from the condensation of resin substance selected from the group consisting of rosin and abietic acid, with material selected from the group consisting of unsaturated aliphatic acids having up to, but not more than, two carboxyl groups, their anhydrides, and their esters.

3. A soap composition in dry, free-flowing, powdered form comprising a small amount of salt electrolyte physically associated with a water-insoluble metallic soap having the complex soap-forming acid radicals of the substance which results from the condensation of resin substance selected from the group consisting of rosin and abietic acid, with material selected from the group consisting of unsaturated aliphatic acids having up to, but not more than, two carboxyl groups, their anhydrides, and their esters, said salt electrolyte being intimately associated with the said soap as a result of precipitating the soap in a solution containing salt electrolyte and separating the soap from the major part of the solution, drying the soap so as to retain some salt electrolyte in admixture therewith, and grinding the mixture to its free-flowing powdered form.

4. A dry, free-flowing, powdered, water-insoluble, metallic soap having the complex soap-forming acid radicals of the substance which results from condensing resin substance selected from the group consisting of rosin and abietic acid, with maleic anhydride.

5. A soap composition in dry, free-flowing, powdered form comprising a small amount of salt electrolyte physically associated with a water-insoluble metallic soap having the complex soap-forming acid radicals of the substance which results from condensing resin substance selected from the group consisting of rosin and abietic acid, with maleic anhydride.

6. A dry, free-flowing, powdered, water-insoluble, metallic soap having the complex soap-forming acid radicals of the substance which results from condensing resin substance selected from the group consisting of rosin and abietic acid, with glyceride of unsaturated, monocarboxylic, aliphatic acid selected from the group consisting of compounds having the formula $C_nH_{2n-3}COOH$ and compounds having the formula $C_nH_{2n-5}COOH$.

7. A soap composition in dry, free-flowing, powdered form comprising a small amount of salt electrolyte physically associated with a water-insoluble metallic soap having the complex soap-forming acid radicals of the substance which results from condensing resin substance from the group consisting of rosin and abietic acid, with glyceride of unsaturated, monocarboxylic, aliphatic acid selected from the group consisting of compounds having the formula $C_nH_{2n-3}COOH$ and compounds having the formula $C_nH_{2n-5}COOH$.

8. A dry, free-flowing, powdered, water-insoluble, metallic soap having the complex soap-forming acid radicals of the substance which results from condensing resin substance selected from the group consisting of rosin and abietic acid, with incompletely polymerized glyceride of drying oil.

9. A soap composition in dry, free-flowing, powdered form comprising a small amount of salt electrolyte physically associated with a water-insoluble metallic soap having the complex soap-forming acid radicals of the substance which results from condensing resin substance selected from the group consisting of rosin and abietic acid, with incompletely polymerized glyceride of drying oil.

10. A dry, free-flowing, powdered, water-insoluble, metallic soap having the complex soap-forming acid radicals of the substance which results from the condensation of resin substance selected from the group consisting of rosin and abietic acid, with incompletely polymerized linseed oil.

11. A soap composition in dry, free-flowing, powdered form comprising a small amount of salt electrolyte physically associated with a water-insoluble metallic soap having the complex soap-forming acid radicals of the substance which results from the condensation of resin substance selected from the group consisting of rosin and abietic acid, with incompletely polymerized linseed oil.

12. A dry, free-flowing, powdered, water-insoluble, metallic soap having the complex soap-forming acid radicals of the substance which results from the condensation of rosin with material selected from the group consisting of unsaturated aliphatic acids having up to, but not more than, two carboxyl groups, their anhydrides, and their esters.

13. A dry, free-flowing, powdered, water-insoluble, metallic soap having the complex soap-forming acid radicals of the substance which results from the condensation of rosin with maleic anhydride.

14. A dry, free-flowing, powdered, water-insoluble, metallic soap having the complex soap-forming acid radicals of the substance which results from the condensation of rosin with glyceride of unsaturated, monocarboxylic, aliphatic acid selected from the group consisting of compounds having the formula $C_nH_{2n-3}COOH$ and compounds having the formula $C_nH_{2n-5}COOH$.

15. A dry, free-flowing, powdered, water-insoluble, metallic soap having the complex soap-forming acid radicals of the substance which results from the condensation of rosin with incompletely polymerized glyceride of drying oil.

16. A dry, free-flowing, powdered, water-insoluble, metallic soap having the complex soap-forming acid radicals of the substance which results from the condensation of rosin with incompletely polymerized linseed oil.

17. A dry, free-flowing, powdered, water-insoluble, metallic soap having the complex soap-forming acid radicals of the substance which results from condensing resin substance selected from the group consisting of rosin and abietic acid, with an $\alpha,\beta$-unsaturated aliphatic acid having up to, but not more than, two carboxyl groups.

18. A dry, free-flowing, powdered, water-insoluble, metallic soap having the complex soap-forming acid radicals of the substance which results from the condensation of rosin with an $\alpha,\beta$-unsaturated aliphatic acid having up to, but not more than, two carboxyl groups.

GRADY M. O'NEAL.